United States Patent [19]
Borcherding et al.

[11] Patent Number: 4,914,332
[45] Date of Patent: Apr. 3, 1990

[54] DYNAMOELECTRIC MACHINE SHAFT RESTRICTOR FOR CONTROLLING END PLAY

[75] Inventors: Gary W. Borcherding, Florissant; John G. Lewis, St. Louis, both of Mo.

[73] Assignee: Emerson Electric Co., St. Louis, Mo.

[21] Appl. No.: 255,758

[22] Filed: Oct. 7, 1988

[51] Int. Cl.4 .............................................. H02K 5/16
[52] U.S. Cl. ...................................... 310/90; 310/261; 384/275
[58] Field of Search ........................... 310/89, 90, 261; 384/173, 275, 245

[56] References Cited
U.S. PATENT DOCUMENTS
2,928,960  3/1960  Macks ................................... 310/90
3,604,962  9/1971  Larson .................................. 310/90

FOREIGN PATENT DOCUMENTS
55-79647  6/1980  Japan ..................................... 310/90

Primary Examiner—Patrick R. Salce
Assistant Examiner—D. L. Rebsch
Attorney, Agent, or Firm—Polster, Polster and Lucchesi

[57] ABSTRACT

A dynamoelectric machine has a rotor affixed to a shaft which is journaled at each end by a bearing assembly. These elements preferably are assembled in a housing. A simplified system for controlling end movement or end play of the shaft during transport of the motor and motor start-up and coast-down eliminates the need for end play washers normally associated with motor construction. The system includes a stop (3) molded into an endshield of the motor so as to be integrally formed in one end wall of the housing, while a spacer (7), which can bear against the bearing at the other end of the shaft restrains end play in the opposite direction.

8 Claims, 1 Drawing Sheet

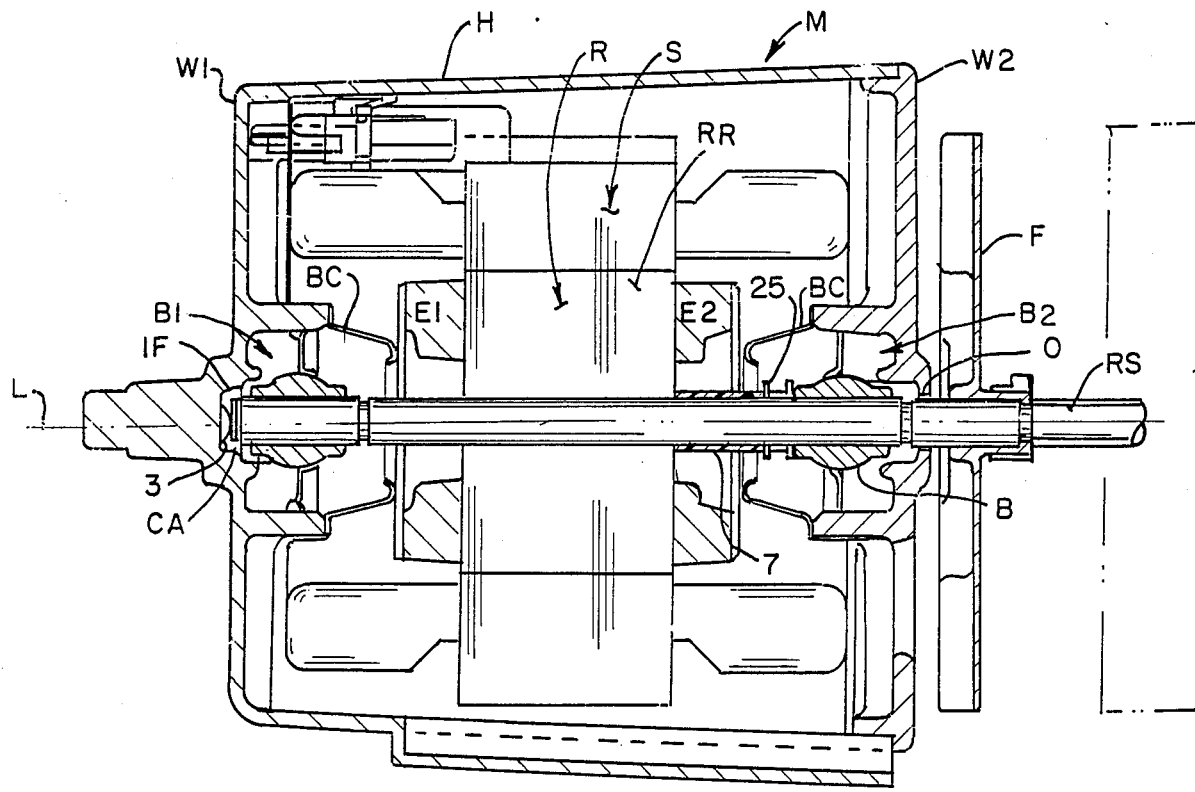
FIG. I.
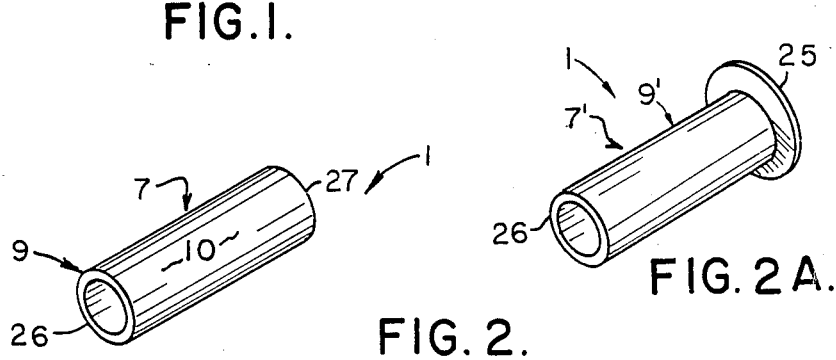
FIG. 2.  FIG. 2A.
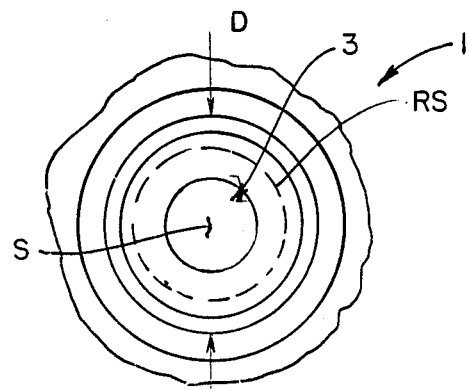
FIG. 3.

DYNAMOELECTRIC MACHINE SHAFT RESTRICTOR FOR CONTROLLING END PLAY

BACKGROUND OF THE INVENTION

This invention relates to dynamoelectric machines and more particularly to an improvement to such machines which restrains linear movement (or end play) of the rotor shaft of the machine during transport and operation. While the invention is disclosed in particular detail with respect to induction motors, those skilled in the art will recognize the wider applicability of the invention disclosed hereinafter.

One problem which may occur during transportation of an electric motor is the end rings on the rotor of the motor striking the bearing caps which are installed about the bearing assemblies which support the rotor. Violent movements, jostling, or jarring of the motor can cause the shaft to axially shift with such force that damage to either the end rings or the bearing caps may result. In either instance, the motor will need repair or replacement, and either solution is both time consuming and costly.

In the past, relatively expensive design techniques have been employed to control end play during motor operation. Generally a rotor assembly of an induction motor, for example, need not be aligned exactly with a corresponding stator assembly on start-up, as the energy of the winding will pull the rotor into alignment. However, if end play is not controlled, the rotor can strike other parts. Rotor control is desirable from at least a customer acceptance standpoint, even when lack of control does not damage the motor or inhibit proper motor operation.

The invention disclosed hereinafter provides end play control with simplified structure at low cost.

SUMMARY OF THE INVENTION

Among the several objects of the present invention may be noted the provision of an improvement to restrain movement of a rotor shaft during transport, start-up, or coast-down of the motor in which the shaft is installed;

The provision of such improvement to prevent damage to the rotor end rings and motor bearing caps which can be caused by excessive shaft movement;

The provision of such improvement to be, in part, integrally formed with the motor enclosure thereby to facilitate motor assembly and reduce the number of parts;

The provision of such improvement to be, in part, readily assembled with the other components of the motor so as to minimize assembly time and cost;

The provision of such improvement to reduce noise and shaft wear, and to facilitate lubrication of motor parts; and The provision of such improvement which is low in cost and easy to incorporate in the motor design.

Other objects and features will be in part apparent and in part pointed out hereinafter.

In accordance with this invention, generally stated, a dynamoelectric machine is provided which includes low cost rotor assembly end play control. The motor includes a molded housing or enclosure. In the preferred embodiment one end wall or end shield is integrally formed with the housing and includes a shaft movement restrictor integrally formed with the end wall. A second shaft movement restrictor is mounted to the shaft and serves a dual function of both a shaft movement restrictor and an oil slinger.

BRIEF DESCRIPTION OF THE DRAWINGS

In the drawings, FIG. 1 is a sectional view of an electric motor including the improvement of the present invention;

FIG. 2 is a perspective view of a first illustrative embodiment of a spacer for mounting on a rotor shaft and comprising another portion of the improvement;

FIG. 2A is a perspective view of a second illustrative embodiment of a spacer for mounting on a rotor shaft; and FIG. 3 is an elevational view of a portion of an inner end wall of the motor housing illustrating a portion of the improvement.

Corresponding reference characters indicate corresponding parts throughout the several views of the drawings.

DESCRIPTION OF A PREFERRED EMBODIMENT

Referring to the drawings, a dynamoelectric machine or electric motor M is illustrated, finding application, for example, in a household appliance such as a dishwasher. In the embodiment illustrated, the motor M is designed to be mounted horizontally in the appliance, as indicated generally in FIG. 1. The motor M has a stator assembly S, and a rotor assembly R; the rotor assembly including a rotor shaft RS and a rotor RR which is affixed to and rotatable with the shaft, all as is well known in the art. Shaft RS is journaled at each end by bearings, a bearing assembly B1 being shown at the left or inner end of the shaft in FIG. 1 and a comparable bearing assembly B2 being shown at the right or outer side of the shaft. The aforementioned components are all assembled in a motor housing or shell H. The housing or shell H is closed on the bearing B1 side by an integrally formed end wall or endshield W1 and is closed on a second side by separable end wall or endshield W2. Those skilled in the art will recognize that each of the endshields or walls W1 and W2 may be separate structures, if desired. The inner end of shaft RS is located adjacent the inner face of the end wall W1 of the housing; while, the other end of the shaft extends out of the housing through an opening 0 in endshield W2. A fan F may be provided for motor M cooling. If used, the fan F is attached to the shaft at any convenient location. Other construction details of the motor M are disclosed in copending U.S. patent application Ser. Nos. 07/255,756, by Baker, 07/255,838, by Borcherding, 07/255,755, by Borcherding et al, 07/255,757, by Borcherding et al, 07/255,706, by Ottersbach, 07/255,707, by Hildebrandt et al, and 07/255,727, by Borcherding, which are assigned to the assignee of the present application, the disclosures of which are intended to be incorporated herein by reference.

As is well known in the art, rotor RR has end rings E1 and E2 respectively assembled on the inner and outer ends of the rotor. If shaft RS experiences an excessive linear or longitudinal movement (such movement being commonly referred to as "end play") either during transportation of the motor (or in applicational use), or during start-up or coast-down of the motor, one of the end rings or the rotor core itself can strike a bearing cap BC of the adjacent bearing assembly. Damage to the rotor, the bearing assembly or both may result, requiring motor M to be either repaired or replaced.

An improvement of the present invention indicated generally 1 in the drawings is means for restraining this longitudinal movement, or end play, of shaft RS to prevent such an occurrence. Means 1 first includes a stop 3 integrally formed with motor housing H to restrain movement of the shaft to the left as viewed in FIG. 1. An end wall W1 of housing H defines a longitudinal passage CA formed along an inner face IF, the passage CA being cylindrical in shape as shown in FIGS. 1 and 3. The purpose of passage CA is described in greater detail in copending U.S. application Ser. No. 07/255,727, discussed above. It is sufficient for present purposes to note that the passage CA, along with other structures function as a labyrinth to restrain lubricating material with each of the bearing assemblies supporting the shaft RS. The center of passage CA is in-line with longitudinal axis L of shaft RS and the passage has dimensions greater than the diameter of the shaft RS. (The circumference of shaft RS is represented by the dashed line circle in FIG. 3 while the dimensions of the passage CA is indicated by the notation D-D). As can be seen in FIG. 1, excessive leftward movement of the shaft could cause it to strike the base of the wall or endshield W1. Without the presence of the invention disclosed herein, such excessive movement would cause end ring E1 of rotor RR to strike the bearing cap BC of bearing assembly B1.

Stop 3 includes a hemispherically shaped dome 5 projecting axially inwardly (to the right in FIG. 1) from the interior surface of the endshield W1. Since the stop 3 is integrally molded with the endshield and in turn the housing, it is sufficiently strong to withstand repeated impacts from the end of the shaft without cracking or flattening. It will be noted that the shaft will not contact the stop 3 when motor M is running due to the solenoid effect created with the rotor by the stator assembly. That is, the electromagnetic field generated in the stator assembly S tends to center rotor assembly R and keep it centered. The hemispherical shape of dome 5 tends to reduce motor noise or whine during coast down of the motor should the shaft contact stop 3, because the stop 3 engages the shaft RS end in point contact.

Means 1 also includes a dual function spacer indicated generally by the reference numeral 7 or 7'. The spacer 7 or 7' is mounted on shaft RS on the bearing assembly B2 side of the motor M. Spacer 7 or 7' comprises a hollow cylinder 9 or 9' whose inner diameter (I.D.) is substantially the same as the diameter of shaft RS. This permits the spacer to have a slight press fit with respect to the shaft RS. In the embodiment illustrated in FIG. 2, an outer surface 10 of the spacer 7 is uniform in shape. The embodiment of FIG. 2A employs a spacer which flares or extends radially outwardly along an end 25 of the spacer, the end 25 being nearest the bearing assembly B2. In any event, the material thickness of the spacer 7, delimits respective end walls 26, 27 at each end of the spaces 7, and an end wall 26' at the opposite end of spacer 7' from end wall 25. One end wall (26 or 26) bears against the rotor RR, while the other end wall can bear against the bearing B of bearing assembly B2, if the rotor assembly RS moves to the right, as referenced in FIG. 1. Such a condition is illustrated in the full line position of the spacer 7' in FIG. 1.

The spacer also serves a second function, which is to facilitate motor lubrication. The high velocity at which the spacer rotates when the motor is running generates centrifugal force which enables the end 27 of the spacer 7, or end 25 of spacer 7', to "sling" lubricant contacting the spacer, off the shaft RS and about the interior of the bearing assembly B2, thereby facilitating its return to the lubricating material spaced about the bearing B2, as more fully set out in copending U.S. patent application No. 07/255,838.

Numerous variations, within the scope of the appended claims will be apparent to those skilled in the art in view of the forgoing descriptions and accompanying drawings. As indicated, the design of the spacer may vary in other embodiments of this invention. The materials used for various components of the motor may be changed. Likewise, while self aligning bearings are illustrated, they may be replaced with ball, roller or sleeve bearings, if desired. The design of the shell and endshields of the motor M all may vary. For example, individual endshields mounted to a core of the stator assembly in a conventional manner may be employed if desired. These variations are merely illustrative.

Having thus described the invention, what is claimed and desired to be secured by Letters Patent is:

1. In dynamoelectric machine comprising a stator assembly, a rotor assembly including a rotor shaft and a rotor affixed to and rotatable with the shaft, a bearing assembly at each end of the shaft for journaling the shaft, and first and second endshields in which the bearing assemblies are housed, an improvement comprising means for restraining longitudinal movement of the rotor assembly during transport of the machine and during machine start-up and coast-down, the restraining means including means integrally formed with the first endshield to restrain axial movement in one direction and spacer means mounted on the shaft for restraining axial movement in the other direction, the first endshield having an interior wall surface adjacent one end of the shaft with a "bump" being formed in the wall, the bump forming a hemispherically shaped dome projecting axially inwardly toward the end of the shaft thereby restraining movement of the shaft in the direction of the wall.

2. The improvement of claim 1 further including a spacer mounted on opposite end of the shaft.

3. The improvement of claim 2 wherein the spacer is mounted on the shaft between the rotor and a bearing assembly at the other end of the shaft, the spacer comprising a hollow cylinder whose inner diameter is such as to permit the spacer to be press fit on the shaft during motor assembly, and to move with the shaft.

4. The improvement of claim 3 wherein the axially outer end of the spacer is integrally formed therewith and extends radially outwardly from the shaft.

5. The improvement of claim 4 wherein the outer surface of the spacer at the axially outer end thereof a portion of said bearing assembly at the second end of said shaft to restrain movement of the shaft when it moves in the direction away from the bump.

6. A dynamoelectric machine, comprising:
a stator assembly having an axial opening defining a bore;
a rotor assembly mounted in said bore, said rotor assembly including a shaft;
first endshield means including means for journaling said shaft;
second enshield means including means for journaling said shaft;
means for providing end play control for said machine, said end play control means comprising first means integrally formed with said first endshield means for preventing movement of said shaft in a direction toward the first endshield means;

and, second means mounted on the opposite end of the shaft preventing movement of said shaft in the opposite direction, said first movement preventing means comprising a hemispherically shaped dome projecting inwardly from an end wall of said first endshield means of the machine toward the one end of the shaft, and said second movement preventing means comprising an elongate spacer mounted to said shaft, said elongate spacer having an outwardly extending flange formed at one end thereof.

7. the dynamoelectric machine of claim 6 wherein said second movement preventing means further comprises an elongate spacer mounted to said shaft.

8. The dynamoelectric machine of claim 7 wherein said elongate spacer is an outwardly extending flange formed along one end thereof.

* * * * *